United States Patent [19]

MacIntyre

[11] Patent Number: 4,502,547
[45] Date of Patent: Mar. 5, 1985

[54] SOIL WORKING DEVICE WITH CLEANER

[75] Inventor: Duncan MacIntyre, Midlothian, Scotland

[73] Assignee: National Research Development Corporation, London, England

[21] Appl. No.: 492,543

[22] Filed: May 9, 1983

Related U.S. Application Data

[63] Continuation of Ser. No. 258,296, Apr. 28, 1981, abandoned.

[30] Foreign Application Priority Data

Apr. 28, 1980 [GB] United Kingdom ............... 8013944

[51] Int. Cl.³ ..................... A01B 15/16; A01B 19/10
[52] U.S. Cl. ......................... 172/606; 172/66
[58] Field of Search ................. 172/606-610, 172/559, 662

[56] References Cited

U.S. PATENT DOCUMENTS

| | | | |
|---|---|---|---|
| 196,617 | 10/1877 | Adams | 172/49 |
| 352,210 | 11/1886 | Thompson | 172/563 |
| 493,182 | 3/1893 | Platt | 172/562 |
| 827,375 | 7/1906 | Kennedy et al. | 172/566 |
| 1,171,798 | 2/1916 | Malcor | 172/96 X |
| 1,519,465 | 12/1924 | Merrymon | 172/607 X |
| 2,020,524 | 11/1935 | Smithburn | 172/544 |
| 2,223,035 | 11/1940 | Haas et al. | 172/96 |
| 2,591,572 | 4/1952 | Mascaro | 172/607 X |

FOREIGN PATENT DOCUMENTS

| | | |
|---|---|---|
| 215675 | 5/1924 | United Kingdom . |
| 265783 | 2/1927 | United Kingdom . |
| 667904 | 3/1952 | United Kingdom . |
| 693077 | 6/1953 | United Kingdom . |
| 695709 | 8/1953 | United Kingdom . |
| 1455258 | 11/1976 | United Kingdom . |
| 1466315 | 3/1977 | United Kingdom . |
| 1498245 | 1/1978 | United Kingdom . |
| 2018553 | 10/1979 | United Kingdom . |

Primary Examiner—George J. Marlo
Attorney, Agent, or Firm—Cushman, Darby & Cushman

[57] ABSTRACT

The presence of rank vegetation or loose crop residue on the soil surface (straw, maize stalks etc.) is always troublesome to ploughs, cultivators, seed drills and other agricultural implements required to slice vertically through and penetrate the soil. In the illustrated embodiment of the invention (FIG. 1), the leading edge area of the knife coulter 10 of a seed drill 14 is continually cleared of trash by resilient disc-mounted cleaning members 16-18. The cleaning members comprise springs which have an outwardly positioned elongated section designed to be engaged by the ground or an abutment on the disc support structure to flex each member as the disc on which they are mounted is rotated. On losing contact with the ground or the abutment, each member will, in turn, spring back from a flexed position (member 16) to a relaxed position (member 17). During this spring back movement, the elongated section moves past or along the leading edge of the knife coulter and strikes trash therefrom.

17 Claims, 2 Drawing Figures

SOIL WORKING DEVICE WITH CLEANER

This is a continuation of application Ser. No. 258,296, filed Apr. 28, 1981, now abandoned.

The invention relates to soil-working assemblies.

The presence of rank vegetation or loose crop residue on the soil surface (straw, maize stalks etc.) is always troublesome to ploughs, cultivators, seed drills and other agricultural implements required to slice vertically and penetrate the soil.

Soil slicing is often performed by a mainly vertical sharp-edged member on the implement e.g. a knife coulter, plough shin plate, or cultivator tine etc. Sometimes this is complemented by having the initial surface penetration made by a ground driven rotating disc cutter working in front of and in line with the main slicing member.

The problem which arises is the wrapping of material on and on either side of the cutting edge of the soil-slicing member. This can build up to the extent that the edge is forced upwards out of contact with the ground and the machine has to be stopped and cleared.

It is an object of the present invention to provide a self-cleaning soil-working assembly which in operation will discourage or prevent a build up of material on the cutting edge above referred to thereby to prevent a wad of material from forming there.

According to the present invention, a self-cleaning soil-working assembly comprises a soil-working element and a resilient cleaning member adapted to spring back from a flexed position to, or towards, a relaxed position, the motion of the resilient member as it moves to, or towards, its relaxed position being used to strike from the soil-working element trash or other matter adhering thereto.

Self-cleaning arrangements for soil-working elements have been disclosed prior to the present invention which involve the use of cleaning members moving at a steady speed past the element to be cleaned. There is a tendency in such cases for material removed from the soil-working element to become attached to the cleaning members instead with correspondingly reduced effectiveness of the latter. This apart, without the inconvenience of having to provide a high-speed drive for the cleaning members, there is always the risk that because of their relatively slow speed, the cleaning members will redeposit significant amounts of the removed material back in the path of the oncoming soil-working element. The cleaning members present in asembilies according to the present invention, on the other hand, avoid both these drawbacks by the flicking action implicit in their "flex and release" mode of operation, the impulsive forces exerted on the offending material being effective to propel it well away from the soil-working element with minimal risk of this material being transferred to the cleaning members instead.

Conveniently, in the assembly of the present invention, the cleaning member is adapted to move in a closed path and during a first part of the closed path, the resilient member is flexed to an ever greater extent as it is forced against an abutment surface following an initial contact therewith, and during a second part of the closed path the resilient member loses contact with the abutment surface and springs back to, or towards, its relaxed position.

Conveniently in this case, the base section of the resilient member is adapted to move bodily in a circular path about a substantially horizontal axis spaced from the abutment surface by an amount significantly less than the projection of the resilient member from said axis when in its fully relaxed position.

Conveniently, the resilient member comprises a base-mounted spring member having a coiled base section leading into an elongate section for engaging the abutment surface.

Conveniently, the resilient member is mounted so as to use the top-surface of the ground over which the assembly moves in operation as the abutment surface.

Conveniently, the abutment surface is provided instead on or by a support structure for the cleaning member.

Conveniently, there is a plurality of said resilient members equispaced along the closed path referred to above.

The soil-working element may, for example, be a knife coulter, plough shin plate, cultivation tine, or like non-rotating element, or a rotary plough element, rotary cultivator element, rotary harrow element, or like rotating element.

The invention also includes a plough, cultivator, seed drill or like agricultural implement incorporating a soil-working assembly according to the present invention.

Embodiments of the invention will now be described, by way of example only, with reference to the accompanying drawings in which.

Figure 1:
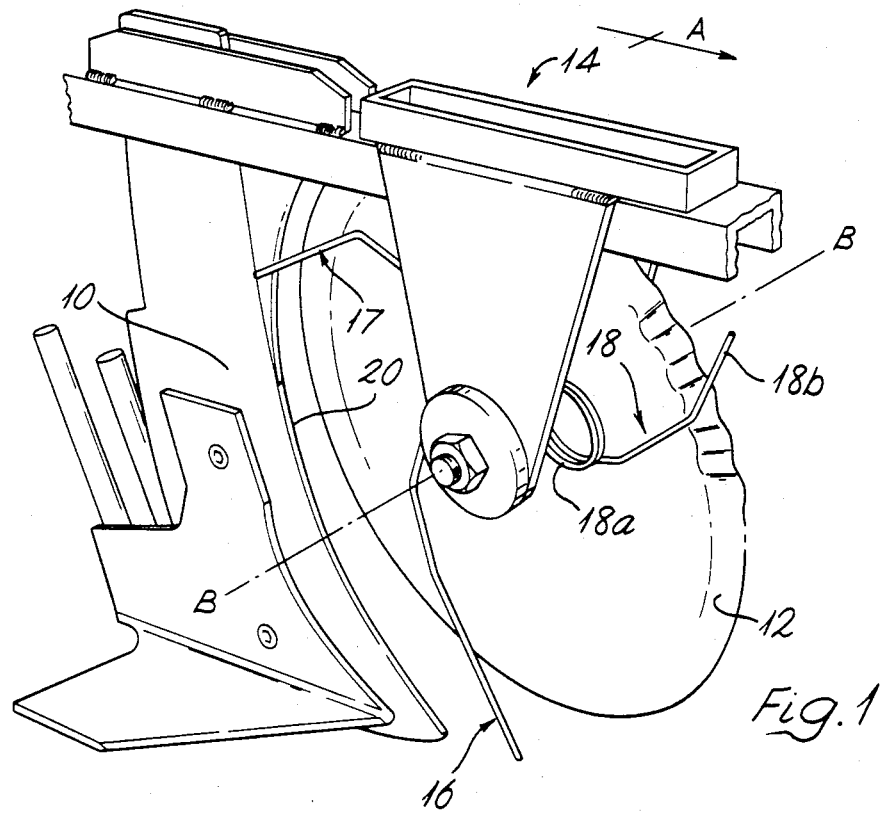
FIG. 1 is a perspective view of a first embodiment of the invention.

Referring first to FIG. 1, this shows the knife coulter 10 and rotating crinkle-edged cutter disc 12 of a direct-seeding drill 14. One such drill is described for example in UK Patent Application No. 3,6978/77.

As the drill is moved forwards (in the direction indicated by arrow A), the cutter disc 12 will make the initial penetration in the soil surface to provide in the soil a vertical slit which will be opened and enlarged by the following coulter 10.

Mounted on the disc 12 are three resilient spring-form members 16, 17, 18 each having a coiled base section (e.g. 18a) secured to the disc 12 and leading into an elongate section (e.g. 18b) for engaging the ground (e.g. when in the illustrated position of member 16).

As will be observed from the drawing, the base sections (18a etc.) of members 16, 17, 18 are equispaced about the rotation axis B-B of disc 12 and this axis is spaced from the abutment surface provided, in the illustrated embodiment, by the top surface of the ground, by an amount significantly less then the projection of these members from axis B-B when they are in their fully relaxed positions (e.g. members 17 and 18 in the situation shown).

The crinkle-edged disc 12 has good trash-cutting properties and it also has the advantage of making positive contact with the soil for slip-free rotation of the disc.

In operation of the assembly above described, forward motion of the drill (in direction A) will result in a ground-driven rotation of disc 12 in the clockwise sense (as viewed in the drawing) so that the base sections 18a etc. of the members 16–18 will be moved bodily around axis B-B in a closed circular path.

During a first part of this path (being traversed by member 16 in the situation shown), each member is flexed to an ever greater extent as the rotating disc forces the base section of the member closer and closer to the ground surface. However, as the disc continues to rotate, the point will be reached at which the member will lose ground contact and will spring back to its relaxed position. During its motion to, or towards, this position the elongate section of the member will strike from the leading (cutting) edge (20) of the coulter 10 any trash or other material gathered there, the separation of this edge from disc axis B-B being such as to allow this to happen with cleaner members of the particular dimensions and configurations chosen for the assembly.

It will be appreciated, that as the disc 12 continues to rotate, the three members 16, 17, 18 will perform in sequence so as to produce continual cleaning of coulter edge 20.

Figure 2:
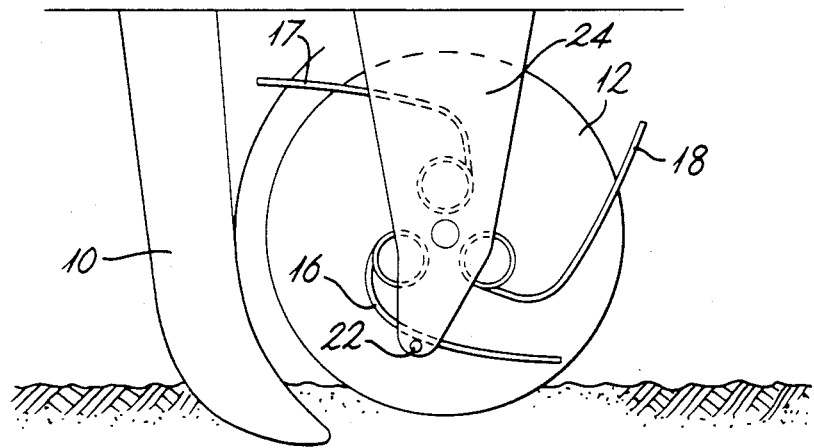
FIG. 2 shows a diagrammatic side view of an alternative embodiment.

Although in the embodiment illustrated in FIG. 1, the abutment surface for flexing members 16-18 is provided by the top surface of the ground over which the drill 14 moves, it is envisaged that in other embodiments of the invention or in modifications of the illustrated embodiment, the cleaning members (whether mounted on a pre-cutting disc or, for example, on some other suitably rotating support) can be arranged to engage with an abutment surface provided not by the ground but by some other part of the soil-working assembly. In such cases, movement of the cleaning members along the abutment part would once again flex them to an ever greater extent until, as with the embodiment of FIG. 1, they would eventually reach a second part of their closed-path motion in which they would lose contact with the abutment surface to strike away trash or other adhering matter as above described. FIG. 2 shows one such alternative in which the abutment surface is provided by a stud 22 projecting inwardly towards disc 12 from a support structure 24 for the disc.

With the embodiments so far described and illustrated, resilient spring-form members 16-18 have been used to allow disc penetration into the ground as the members are flexed. In variations (not shown) of these embodiments, this resilience may be achieved by any other suitable type of spring mountings for the ground-engaging or abutment-engaging members.

In variations of the illustrated embodiments and of the various modifications and alternatives above referred to, the cleaning members are carried in their closed-path motion by a positively-powered support rather than by one relying on ground-engagement as with the illustrated embodiments.

As already indicated, the self-cleaning soil-working assembly of the present invention can be used in a variety of contexts and the invention is therefore not to be interpreted as being limited to those specific examples discussed in the application.

I claim:

1. A self-cleaning soil-working assembly comprising soil-working element having a leading edge adapted to be moved in a working direction, a cutting disc having an outer periphery rotatably mounted ahead of said edge to form a vertical slit in the soil being worked which will be further enlarged by the following leading edge, and at least one resilient cleaning member mounted to the side of said disc so as to extend beyond the outer periphery of said disc so that as said disc moves through the soil, the cleaning member is rotated therewith and periodically flexed from a first position to a second flexed position and then abruptly released to rapidly spring back toward said first position through a significant arc along said soil-working element and said disc whereby matter retained on said leading edge and said disc is removed therefrom.

2. An assembly as claimed in claim 1 in which the resilient cleaning member is adapted to move repeatedly through a closed path so that it repeatedly engages and is released by means defining an abutment whereby during a first part of the closed path, the resilient member is flexed to an ever greater extent as it is forced against said abutment means following an initial contact therewith and during a second part of the closed path the resilient member loses contact with the abutment surface and springs back to, or towards, its relaxed position.

3. An assembly as claimed in claim 2 in which the resilient member comprises a base-mounted spring member having a coiled base section leading into an elongate section for engaging said abutment means.

4. An assembly as claimed in claim 2 in which the resilient member is mounted so as to use the top-surface of the ground over which the assembly moves in operation as said abutment means.

5. An assembly as claimed in claim 2 in which said abutment means comprises a support structure for the resilient cleaning member.

6. An assembly as claimed in claim 1 in which the base section the resilient cleaning member has a base section adapted to move bodily in a circular path about a substantially horizontal axis spaced from said abutment means by an amount significantly less than the projection of the resilient member from said axis when in its fully relaxed position.

7. An assembly as claimed in claim 1 including a plurality of said cleaning members equispaced along said closed path.

8. An assembly as claimed in claim 1 in which the soil-working element is a knife coulter, plough shin plate, cultivation tine, or like non-rotating element, or a rotary plough element, rotary cultivator element, rotary harrow element, or like rotating element.

9. A plough, cultivator, seed drill or like agricultural implement incorporating a soil-working assembly as claimed in claim 1.

10. A self-cleaning, soil-working assembly comprising frame means for supporting said assembly, a fixed soil-working element depending from said frame, a disc element depending from said frame and positioned ahead of and substantially in alignment with said fixed element and mounted so as to be rotatable, at least one resilient spring member fixed to the side of said disc so as to be movable therewith and between flexed and unflexed positions and having a length sufficient to extend from said disc to said fixed element so that during use, as said disc rotates, said resilient spring member can be repeatedly flexed between the flexed and unflexed positions and in springing back to its unflexed position, the spring member passes along a portion of the side of said disc and along a portion of the fixed soil-working element.

11. An assembly as claimed in claim 10 in which the resilient cleaning member is adapted to move through a closed path so that it repeatedly engages and is released by means defining an abutment whereby during a first part of the closed path, the resilient member is flexed to an ever greater extent as it is forced against said abutment means following an initial contact therewith and during a second part of the closed path the resilient member loses contact with the abutment surface and springs back to, or towards, its relaxed position.

12. An assembly as claimed in claim 11 in which the resilient cleaning member has a base section adapted to move bodily in a circular path about a substantially horizontal axis spaced from said abutment means by an amount significantly less than the projection of the resilient member from said axis when in its fully relaxed position.

13. An assembly as claimed in claim 11 in which the resilient member comprises a base-mounted spring member having a coiled base section leading into an elongate section for engaging said abutment means.

14. An assembly as claimed in claim 11 in which the resilient member is mounted so as to use the top-surface of the ground over which the assembly moves in operation as said abutment means.

15. An assembly as claimed in claim 11 in which said abutment means comprises a support structure for the resilient cleaning member.

16. An assembly as claimed in claim 11 including a plurality of said resilient cleaning members equispaced along said closed path.

17. An assembly as claimed in claim 10 in which the soil-working element is a knife coulter, plough shin plate, cultivation tine, or like non-rotating element, or a rotary plough element, rotary cultivator element, rotary harrow element, or like rotating element.

* * * * *